United States Patent Office 3,137,540
Patented June 16, 1964

3,137,540
TREATMENT OF SHAPED POLYVINYL
ALCOHOL BODIES
Tetsuro Osugi, Masakazu Matsumoto, Kenichi Tanabe, and Yasuji Ohno, all of Kurashiki, Japan, assignors of three-fourths to Kurashiki Rayon Co., Ltd., Okayama Prefecture, Japan, a corporation of Japan, and one-fourth to Air Reduction Company Incorporated, New York, N.Y., a corporation of New York
No Drawing. Continuation of application Ser. No. 340,922, Mar. 6, 1953. This application Apr. 5, 1960, Ser. No. 19,984
Claims priority, application Japan Mar. 12, 1952
6 Claims. (Cl. 8—115.5)

This invention relates to a novel method for treating shaped polyvinyl alcohol articles to increase their wet heat resistance and water repellency, and particularly to improve their elastic properties.

It is well-known to improve the wet heat resistance of polyvinyl alcohol articles and to insolubilize them by treating such articles with aqueous solutions containing water-soluble aldehydes, particularly formaldehyde. When this acetalization procedure is applied directly to newly formed polyvinyl alcohol fibers or articles, the acetalized fibers or articles shrink or swell to a considerable extent in hot or boiling water, despite their insolubilization, and the heat resistance is considerably decreased. If this treatment is applied to polyvinyl alcohol fibers or articles which have been previously made more water resistant by a heat treatment, their shrinking or swelling in hot or boiling water is so much reduced as to render such heat-treated fibers and articles suitable for practical use, whereby the good heat resistance remains substantially unchanged, as disclosed and claimed in the patent application, Serial Number 300,375 by Tsukumo Tomonari and Shigeki Nomura, filed July 23, 1952, and which is now Patent No. 2,990,235, which is a continuation-in-part of patent application Serial Number 154,873, filed April 8, 1950, now abandoned.

We have found that a treatment of heat-treated polyvinyl alcohol articles with aldehydes and ketones having at least 4 carbon atoms, or with acetals and ketals thereof with lower alcohols such as methylalcohol, ethylalcohol, propylalcohol, ethylene glycol, and the like, imparts to such articles properties, particularly excellent elastic recovery or resiliency and water repellency, which cannot be obtained by a treatment with formaldehyde or acetaldehyde, in addition to sufficient resistance to hot or boiling water and heat resistance to be intended for practical use. We have also found that polyvinyl alcohol articles can be acetalized or ketalized with such higher aldehydes, ketones, acetals or ketals that are insoluble or difficultly soluble in water, preferably in aqueous medium by adding surface active agents.

The different action of lower aldehydes and higher aldehydes is best illustrated by the following table, which shows the results of the action of various aldehydes on polyvinyl alcohol fibers having a softening point in air of about 224° C. and in water of about 90 to 94° C. These fibers were obtained according to the method described in the application, Serial Number 300,375, noted previously.

In the table, the softening point is the temperature at which the fiber shrinks 10 percent, and the softening point in water is the temperature of water in which the fiber shrinks 10 percent. The elastic recovery is the recovery in percent of fiber length after the fiber had been elongated by 1 percent and 3 percent, respectively, and released. The water repellency is measured by the length of time which the fiber floats without sinking on the surface of water at room temperature. The degree of acetalization is defined by the ratio of the original hydroxyl groups acetalized by the aldehyde treatment.

TABLE

| Test No. | Aldehyde | Degree of Acetalization, mol percent | Softening Point in— | | Shrinkage in— | | Tensile strength | | | Elastic recovery after elongation of | | Water repellency |
|---|---|---|---|---|---|---|---|---|---|---|---|---|
| | | | Water, percent | Air, percent | Water of 100° C., percent | Air of 200° C., percent | Dry, gr./d. | Wet, gr./d. | Wet/dry, percent | 1% | 3% | |
| 1 | Formaldehyde | 12.2 | 95 | 216 | 54.7 | 7.0 | 2.04 | 1.33 | 65.3 | 72 | 54 | 0.3 min. |
| 2 | do | 27.9 | 100 | 219 | 5.3 | 5.5 | 2.11 | 1.35 | 64.5 | 81 | 52 | 0.4 min. |
| 3 | do | 35.3 | 100 | 216 | 4.2 | 6.0 | 2.09 | 1.26 | 60.5 | 83 | 57 | 0.5 min. |
| 4 | do | 41.5 | 100 | 217 | 3.1 | 5.0 | 2.06 | 1.32 | 64.2 | 82 | 56 | 0.5 min. |
| 5 | Acetaldehyde | 33.8 | 100 | 214 | 6.0 | 7.0 | 1.87 | 0.62 | 32.9 | 83 | 56 | 3.0 min. |
| 6 | do | 45.1 | 100 | 205 | 5.3 | 9.0 | 2.19 | 0.89 | 40.8 | 87 | 54 | 4.0 min. |
| 7 | n-Butyraldehyde | 26.0 | 100 | 202 | 7.0 | 9.8 | 2.42 | 1.54 | 63.8 | 100 | 61 | 1200 min. |
| 8 | do | 35.2 | 100 | 196 | 12.0 | 13.4 | 2.18 | 1.44 | 66.0 | 99 | 66 | 1400 min. |
| 9 | Isovaleraldehyde | 26.4 | 100 | 198 | 12.5 | 13.8 | 2.20 | 1.61 | 73.0 | 95 | 64 | Many days. |
| 10 | do | 30.2 | 100 | 138 | 10.0 | 15.2 | 2.19 | 1.55 | 70.8 | 100 | 66 | Do. |
| 11 | Heptaldehyde | 14.3 | 100 | 214 | 12.0 | 6.1 | 2.35 | 1.28 | 54.0 | 92 | 58 | Do. |
| 12 | Benzaldehyde | 15.1 | 100 | 204 | 43.5 | 6.3 | 2.82 | 1.51 | 53.7 | 96 | 65 | Do. |
| 13 | do | 30.7 | 100 | 200 | 6.0 | 10.0 | 2.08 | 1.50 | 72.1 | 98 | 77 | Do. |
| 14 | do | 41.0 | 100 | 180 | 9.2 | 19.0 | 1.85 | 1.35 | 72.6 | 100 | 82 | Do. |
| 15 | p-Tolylaldehyde | 20.2 | 100 | 200 | 5.5 | 10.0 | 2.10 | 1.38 | 65.6 | 98 | 68 | Do. |
| 16 | o-Chlorobenzaldehyde | 22.7 | 100 | 198 | 9.0 | 16.8 | 1.93 | 1.31 | 67.5 | 98 | 82 | Do. |
| 17 | m-Nitrobenzaldehyde | 30.6 | 100 | 195 | 3.8 | 12.0 | 1.74 | 1.34 | 77.0 | 97 | 77 | Do. |
| 18 | p-Cyanobenzaldehyde | 34.3 | 100 | 187 | 5.8 | 14.0 | 1.82 | 1.28 | 70.3 | 97 | 85 | Do. |
| 19 | Salicylaldehyde | 12.2 | 100 | 223 | 6.6 | 4.0 | 1.52 | 1.26 | 75.4 | 93 | 72 | Do. |

The table shows that the heat and wet heat resistance is most effectively improved by a treatment with formaldehyde and decreases slightly when higher aldehydes are used. The latter, however, improve considerably the elastic recovery and especially the water repellency. It is to be noted that this improvement is already conspicuous at relatively low acetalization degree.

According to A. Weihe Kunststoffe, vol. 31, page 53 (1941), the softening point of polyvinyl acetals with various aldehydes is shown in the following table:

[Softening points in ° C.]

Polyvinyl alcohol-formaldehyde acetal _____ 110
Polyvinyl alcohol-acetaldehyde acetal _____ 88
Polyvinyl alcohol-propionaldehyde acetal _____ 76
Polyvinyl alcohol-n-butyraldehyde acetal _____ 65
Polyvinyl alcohol-n-hexaldehyde acetal _____ 58
Polyvinyl alcohol-oleylaldehyde acetal _____ 40

A polyvinyl alcohol fiber consists of amorphous and readiy accessible parts, and of crystalline and inaccessible or difficultly accessible parts. When such a fiber is acetalized the reaction will proceed mainly in the amorphous parts at the early stages of acetalization and will then slowly extend into the crystalline parts. If the acetalization is applied to newly spun fibers, which were not subjected to a heat treatment, the original crystalline parts become easily accessible during the reaction, and consequently, the softening point in air of the acetalized fiber decreases considerably and approaches the value shown by Weihe as the acetalization proceeds. The softening point in water of the partially acetalized fiber is also insufficient, because of the presence of the remaining accessible hydroxyl groups. When a heat-treated fiber is acetalized, the original crystalline parts remain generally inaccessible under conventional treating conditions, and the decrease of the softening point in air is not so great. The softening point in water of the acetalized fiber reaches easily 100° C. because of the absence of the accessible hydroxyl groups and because of the higher heat resistance in air.

Representative examples of suitable aldehydes, ketones, acetals and ketals are n-butyraldehyde, isobutyraldehyde, valeraldehyde, isovaleraldehyde, capronic aldehyde, heptaldehyde, caprylic aldehyde, undecylaldehyde, lauric aldehyde, palmitic aldehyde, stearic aldehyde, oleic aldehyde, alpha-ethyl-beta-propylacrolein, benzaldehyde, tolylaldehydes, phenylacetaldehyde, cinnamic aldehyde, naphthaldehydes, anisaldehyde, furfural, tetrahydrofurfural, chlorobenzaldehydes, methoxybenzaldehydes, nitrobenzaldehydes, salicylaldehyde, oxynaphthaldehydes, thiophenaldehyde, cyanobenzaldehydes, terephthalic acid aldehydes, phenoxypropionic aldehyde, nitrophenoxyacetaldehydes, chlorophenoxyacetaldehydes, hexahydrobenzaldehyde, etc.; acetophenone, benzophenone, tetrahydroquinone, cyclohexanone, nitrocyclohexanones, chlorocyclohexanones, etc.; and their acetals and ketals with lower alcohols. Also mixtures of these compounds may be used.

These higher aldehydes, ketones, acetals and ketals are insoluble or only sparingly soluble in water. For example, the solubility in water of various aldehydes at room temperature is shown as follows:

| | |
|---|---|
| Formaldehyde | ∞. |
| Acetaldehyde | ∞. |
| Propionaldehyde | 16.2%. |
| Butyraldehyde | 3.7%. |
| Valeraldehyde | 0. |
| Acetaldehyde-diethylacetal | 4.6%. |
| Benzaldehyde | 0.33%. |
| Cyclohexanone | slightly. |

They are preferably applied in the form of an aqueous emulsion which contains about 0.5 to 15 percent of them, in the presence of an acid or an acid and a salt.

In order to emulsify these compounds in water, surface active agents are used, and the selection of the suitable type of surface active agent, or of a mixture of such agents, will depend on the nature of the acetalizing or ketalizing compound and on the other components of the acetalizing bath in which it should be stable. We may use either anion active agents, such as sulfuric esters of fatty alcohols, alkane sulfonates, alkyl-aromatic sulfonates, sulfonated esters, or cation active agents such as quaternary ammonium salts, pyridinium salts, piperidinium salts, morpholinium salts, amino alcohol derivatives, or nonionic agents, such as polyoxyethylene ethers of high molecular weight aliphatic alcohols or alkyl phenols, aliphatic fatty acid esters of polyethylene glycol, sorbitan derivatives, and the like.

The acetalization or ketalization in the form of an aqueous emulsion is not only inexpensive but also proceeds rapidly as compared with that in an organic solvent solution.

The acetalization or ketalization bath may contain the conventional acids as catalysts or such acids and salts to prevent excessive swelling of the polyvinyl alcohol articles. As acids we may use inorganic acids, such as sulfuric acid, hydrochloric acid, nitric acid, and phosphoric acid, or mixtures of such inorganic acids and water soluble organic acids having less than five carbon atoms; also mixtures of these acids can be used, and the concentrations may vary within wide limits from about 0.1 to 25 percent based on weight of the bath. The salts will be, in general, a salt or a mixture of salts of the acid used, and the bath may contain up to about 25 percent by weight of such salts.

The acetalization or ketalization rate and degree can be controlled to a certain extent by the composition of the acetalizing bath and the temperatures and times of reaction. In general, the reaction rate is increased by increasing temperatures, increasing aldehyde or ketone concentration, increasing acid concentration, and decreasing salt concentration.

The speed and degree of reaction depend also on the properties and history of the articles to be acetalized. If the article had been heat-treated, the acetalization reaction is retarded, depending on the degree of insolubilization obtained. If the preceding heat treatment of the polyvinyl alcohol article has raised its softening temperature in water to 80–96° C., the acetalization with higher aldehydes proceeds rather slowly to a limited degree. This is not objectionable because we prefer to apply our novel acetalization method to polyvinyl alcohol articles which are already fairly water resistant. The articles should not be soluble in water of less than 70° C. and should shrink or elongate in water of 50° C. by not more than 20 percent in any direction. With respect to fibers, we prefer to use fibers which shrink in water of 80° C. by not more than 5 percent of their length. Under these conditions, a relatively low acetalization or ketalization with higher aldehydes or ketones is sufficient to attain the desired improved elastic recovery, water repellency and sufficient heat resistance in air and water desired for practical use. A very excessive acetalization or ketalization under severe conditions should be avoided in order to prevent a harmful decrease of the heat resistance.

As explained above, the softening temperature of homogeneous polyvinyl alcohol acetals of higher aldehydes is low but it is high for heterogeneous articles, such as fibers which were coagulated and spun from an aqueous polyvinyl alcohol solution, dried and heat-treated before acetalization. The elastic properties of such fibers acetalized in accordance with the invention compare favorably with those of wool.

The table given above shows that the acetalization with formaldehyde improves the heat and wet heat resistance of polyvinyl alcohol articles, whereas acetalization with higher aldehydes improves the elastic recovery and water repellency. Therefore, a modification of our invention consists in combining the two acetalization procedures so as to obtain a polyvinyl alcohol article having a high softening point in air and water as well as good elastic properties and water repellency. This can be accomplished by using a single acetalization bath containing formaldehyde and a higher aldehyde, acetal, ketone, or ketal or by subjecting the article to successive treatments in whatever order.

We have described our new process with respect to polyvinyl alcohol fibers, but it can be applied also to other shaped polyvinyl alcohol articles such as bristles, films, sheets, plates, ribbons, rods, and the like.

The following illustrative examples are given to show our novel acetalizing method, and are not intended to limit the invention in any way. All figures are given by weight, unless stated otherwise.

In order to obtain comparative figures for the various modes of treatment according to the invention, we used in all examples concerned with fibers nearly the same type of polyvinyl alcohol fiber, which had a denier of 2.5 and a softening point in water of 85° C. to 91° C. The fiber was obtained according to the process of patent application, Serial Number 300,375, mentioned above, by spinning an aqueous polyvinyl alcohol solution into a salt bath, stretching the filaments and heat-treating them at 225° C. It is to be understood that similar results with respect to elastic recovery and water repellency in addition to sufficient heat resistance in air and water are obtained with polyvinyl alcohol fibers or shaped articles prepared by other methods.

tests 5% of formaldehyde and 15% of sodium sulfate. The only variable was the concentration of sulfuric acid in the formaldehyde bath, and the following table shows its influence on the acetalization degrees, shrinkage and elastic recovery of the fibers after the treatment in both baths.

|   | $H_2SO_4$ in $CH_2O$ bath, percent | Acetalization Degree | | | Percent Shrinkage | | Elastic Recovery after elongation of— | |
|---|---|---|---|---|---|---|---|---|
|   |   | In $CH_2O$ | In $C_6H_5CHO$ | Total | In water of 100° C. | In air of 200° C. | 1% | 3% |
| 1 | 2  | 3.6  | 30.5 | 34.1 | 18.0 | 16 | 99 | 69 |
| 2 | 5  | 13.4 | 25.3 | 38.7 | 8.3  | 14 | 98 | 64 |
| 3 | 7  | 20.6 | 15.4 | 36.0 | 4.8  | 8  | 96 | 58 |
| 4 | 10 | 30.2 | 5.4  | 35.6 | 3.2  | 6  | 96 | 53 |

Example 1

Fibers were subjected for 60 minutes at 60° C. to the action of an aqueous bath containing 2% of benzaldehyde, 5% of sulfuric acid, and varying amounts of methanol or various surface active agents. The results of the tests are given in the table below.

| Methanol, percent | Surface Active Agent | Degree of Acetalization in percent | Shrinkage in water of 100° C. in percent | Tensile Strength, g./den. |
|---|---|---|---|---|
| A—60 |     | 10 | 42 | 2.4 |
| B—30 |     | 16 | 35 | 2.2 |
| C     | (c) | 34 | 6  | 2.2 |
| D     | (d) | 29 | 9  | 2.1 |
| E     | (e) | 24 | 14 | 2.2 |
| F     | (f) | 23 | 19 | 2.2 |

(c) 0.5% of fatty alcohol sulfate.
(d) 1.5% of dodecyl benzene sulfonate.
(e) 3% of alkyl pyridinium chloride.
(f) 3% of polyethylene glycol ester of fatty acid.

The table shows that the acetalization rate is considerably increased and that the water resistance is greatly improved if the benzaldehyde is applied in emulsion. The tensile properties are not much influenced by the degree of acetalization.

Example 2

The fiber defined above was acetalized for 1 hour at 70° C. in an aqueous solution containing 5% of sulfuric acid, 0.3% of a fatty alcohol sulfate, and 3% of formaldehyde as well as 1% of benzaldehyde. The shrinkage of the acetalized fiber was 4.7% in water of 100° C. and 4.5% in air of 200° C. The elastic recovery was 99% after 1% elongation and 66% after 3% elongation.

Example 3

The fiber was first acetalized at a temperature of 70° C. for one hour with formaldehyde, and subsequently at 60° C. for one hour with benzaldehyde. Four comparative tests were made. The benzaldehyde bath had in all four tests the same composition and contained 2% of benzaldehyde, 5% of sulfuric acid, and 1% of a fatty alcohol sulfate. The formaldehyde bath contained in all

Example 4

The fiber was first acetalized for one hour at 60° C. in an o-chlorobenzaldehyde bath containing 2% of o-chlorobenzaldehyde, 5% of sulfuric acid, and 1.5% of fatty alcohol sulfate, and then for one hour at 70° C. in an aqueous formaldehyde solution containing 5% of formaldehyde, 10% of sulfuric acid, and 15% of sodium sulfate. The thus acetalized fiber had a shrinkage of 5% in water of 100° C. and a shrinkage of 5.5% in air of 200° C.; its elastic recovery was 97 after 1% elongation and 61 after 3% elongation.

Example 5

The fiber was ketalized first for 1 hour at 70° C. in an aqueous emulsion containing 5% of cyclohexanone, 15% of sulfuric acid, 5% of sodium sulfate, and 3% of Nacconol NR. Subsequently, it was acetalized for 30 minutes at 60° C. in an aqueous solution containing 3% of formaldehyde, 10% of sulfuric acid, and 10% of sodium sulfate. The obtained fiber had excellent water resistance, heat and wet heat resistance, and elastic recovery properties.

Example 6

Fibers were acetalized for 1 hour at 60° C. in the following four different solutions.

(1) 1% of butyraldehyde, 5% of sulfuric acid, 5% of sodium sulfate, 2% of dodecyl benzene sulfonate;
(2) 2% of isovaleraldehyde, 10% of sulfuric acid, 1.5% of fatty alcohol sulfates;
(3) 2% of heptaldehyde, 5% of sulfuric acid, 2% of polyethyleneglycol oleate;
(4) 2% of benzaldehyde, 5% of sulfuric acid, 2% of polyethyleneglycol ether of alkyl phenol.

The resulting properties of the obtained fibers are shown in the following table:

|   | Degree of Acetalization | Softening Point in— | | Tensile strength in g./d. | | Elastic Recovery | | Water Repellency |
|---|---|---|---|---|---|---|---|---|
|   |   | Water | Air | Dry | Wet | 1% el. | 3% el. |   |
| 1 | 26.0 | 100 | 202 | 2.42 | 1.54 | 100 | 61 | 1,200 min. |
| 2 | 30.2 | 100 | 188 | 2.19 | 1.55 | 100 | 66 | Many days. |
| 3 | 14.3 | 100 | 214 | 2.35 | 1.28 | 92  | 58 | Do. |
| 4 | 30.7 | 100 | 200 | 2.08 | 1.50 | 98  | 77 | Do. |

Example 7

The fiber was acetalized for 1 hour at 60° C. in an aqueous bath containing 2% of heptaldehyde and 5% of sulfuric acid emulsified with a mixture of 1% of sorbitan laurate and 1% of dodecylbenzene sulfonate. The acetalization degree of the obtained fiber was 15%, the shrinkage in boiling water 9.0%, the softening point in air 215° C., and the elastic recovery at 1% elongation 92% and at 3% elongation 56%.

If the same fiber was acetalized under the same conditions in an emulsion containing 3% of alpha-ethyl-beta-propyl acrolein, 10% of sulfuric acid and 1.5% of fatty alcohol sulfate, the acetalization degree was 12% and the properties similar to those of the fiber acetalized with heptaldehyde. Both fibers showed excellent water repellence and remained for many days unwetted by water.

*Example 8*

The following emulsions were used to acetalize polyvinyl alcohol fibers, under the same conditions as stated hereinbefore.

(1) 3% of naphthaldehyde, 5% of sulfuric acid, 2% of fatty alcohol sulfate;
(2) 3% of cinnamicaldehyde, 10% of sulfuric acid, 2% of alkylaryl sulfonate;
(3) 4% of phenylacetaldehyde, 7% of sulfuric acid, 3% of Nacconol NR.

In all three cases, the fibers had excellent water repellent and elastic recovery properties.

*Example 9*

Heat-treated polyvinyl alcohol fibers were acetalized for 1 hour at 65° C. in the following aqueous solutions:

(1) 2% of o-chlorobenzaldehyde, 10% of sulfuric acid, 40% of methanol;
(2) 1.3% of o-chlorobenzaldehyde, 2.5% of sulfuric acid, 0.5% of fatty alcohol sulfate;
(3) 1.3% of m-nitrobenzaldehyde, 2.5% of sulfuric acid, 0.5% of fatty alcohol sulfate;
(4) 1.3% of p-chlorobenzaldehyde, 3% of sulfuric acid, 0.5% of fatty alcohol sulfate.

The following table shows degrees of acetalization and properties of the obtained fibers:

| | Degree of Acetalization in mol percent | Shrinkage in water of 100° C. in percent | Elastic recovery, in percent, after elongation of | |
|---|---|---|---|---|
| | | | 1% | 3% |
| 1 | 25 | 7 | 99 | 83 |
| 2 | 24 | 6 | 99 | 81 |
| 3 | 21 | 8 | 98 | 79 |
| 4 | 27 | 5 | 99 | 80 |

*Example 10*

A polyvinyl alcohol bristle having a diameter of 0.5 mm. was stretched for 1 minute at 150° C. to 2.5 times its original length (I), and then heat-treated for 1 minute at 220° C. (II). I and II were acetalized for 1 hour at 40° C. in a bath consisting of 2% of o-chlorobenzaldehyde, 2% of sulfuric acid, 1% of fatty alcohol sulfate and 95% water (III) and (IV) respectively.

The dry and wet heat resistances of these bristles are shown in the following table:

[Shrinkage in percent]

| | I | II | III | IV |
|---|---|---|---|---|
| In water of 15° C | 0 | 0 | 0 | 0 |
| In water of 50° C | 27 | −2 | 10 | −7 |
| In water of 70° C | 46 | −3 | 48 | −7 |
| In water of 90° C | Dissolved | −2 | Dissolved | −8 |
| In water of 100° C | do | Dissolved | do | −3 |
| In air of 50° C | 0 | 1 | 2 | 1 |
| In air of 100° C | 2 | 1 | 7 | 2 |
| In air of 150° C | 9 | 0 | 12 | 4 |
| In air of 200° C | 13 | 1 | 43 | 7 |

(−)=Elongation.

The results show that the bristle acetalized after heat-treatment had better dry and wet heat resistances than the bristle acetalized without previous heat-treating.

The bristle acetalized with o-chlorobenzaldehyde after heat-treatment (IV) had more excellent elastic properties

*Example 11*

A polyvinyl alcohol film having a thickness of 25/100 mm. was made by evaporating an aqueous polyvinyl alcohol solution (I). The film was heat-treated for 3 minutes at 205° C. (II). I and II were acetalized for 20 minutes at 50° C. in a bath containing 2% of m-nitrobenzaldehyde, 2% of sulfuric acid and 1% of fatty alcohol sulfate, (III) and (IV), respectively. III is dissolved in the bath during acetalization. The resistance in water of the films I, II and IV is shown in the following table.

[Elongation in percent]

| | | | |
|---|---|---|---|
| In water of 15° C | 32 | 8 | 0 |
| In water of 50° C | 53 | 12 | 0 |
| In water of 70° C | Dissolved | 14 | 0 |
| In water of 80° C | do | 19 | 2 |
| In water of 90° C | do | Dissolved | 8 |

The film acetalized with m-nitrobenzaldehyde after heat-treatment had better elastic properties than that formalized.

We have found that a polyvinyl alcohol fiber or a shaped polyvinyl alcohol body which was treated with a compound selected from the group consisting of aldehydes, ketones having at least four carbon atoms and acetals thereof, have improved properties not only as to their hot-water resistance and heat resistance but also with respect to their resilience, especially at a high elongation degree, when said treatment is applied after, simultaneously with, or before a treatment of the article with one or more compounds selected from the group consisting of dialdehydes, aldehyde-ketones and acetals thereof.

*Example 12*

A polyvinyl alcohol fiber made by wet spinning process was heat-treated for 3 minutes at 220° C. (I) and then treated for 1 hour at 70° C. in an aqueous emulsion containing 1 percent of o-chlorobenzaldehyde, 3 percent of sulfuric acid and 1 percent of sodium salt of alkyl benzene sulfonic acid (II). The fibers I and II were treated for 1 hour at 70° C. in an aqueous solution containing 10 percent of sulfuric acid, 10 percent of sodium sulfate and 0.3 percent of terephthalic aldehyde (III and IV, respectively).

The dry and wet heat resistance and the elastic recovery of the fibers, II, III and IV, and the elastic recovery of wool are shown in the following table. The dry heat resistance is illustrated by the softening temperature (° C.) in air, and the wet heat resistance is shown by the shrinkage (percent) when treated in boiling water for 1 hour.

| | II Acetalized with o-chlorobenzaldehyde | III Acetalized with terephthalic aldehyde | IV Acetalized with o-chlorobenzaldehyde and terephthalic aldehyde | Wool |
|---|---|---|---|---|
| Softening temp. in air (°C.) | 190 | 225 | 217 | |
| Shrinkage in boiling water (percent) | 7.0 | 0.1 | 0.0 | |
| Elastic recovery (percent): | | | | |
| At 1% elongation | 100 | 92 | 100 | 99 |
| At 2% elongation | 90 | 83 | 96 | 93 |
| At 3% elongation | 77 | 82 | 87 | 87 |
| At 5% elongation | 52 | 80 | 71 | 75 |
| At 7% elongation | 41 | 80 | 60 | 62 |
| At 10% elongation | 35 | 78 | 50 | 48 |

The results show that the fiber acetalized with o-chlorobenzaldehyde (II) is excellent with respect to elastic recovery at lower elongation, the fiber acetalized with terephthalic aldehyde (III) is excellent with respect to elastic recovery at higher elongation, and the fiber acetalized with o-chlorobenzaldehyde and terephthalic aldehyde (IV) is excellent with respect to elastic recovery in the range of 1 to 10 percent elongation and its elastic recovery is fully comparable to that of wool.

In addition, the results show that the dry and wet heat resistance of the fiber acetalized with o-chlorobenzaldehyde (II) is considerably improved by the additional acetalization with terephthalic aldehyde.

*Example 13*

A fiber heat-treated as in Example 12 was treated for 1 hour at 70° C. in an aqueous solution containing 2% of glyoxal, 15% of sulfuric acid, and 15% of sodium sulfate. Subsequently, it was treated for 1 hour at 60° C. in an aqueous solution containing 1% of n-butyraldehyde, 10% of sulfuric acid, and 10% of sodium sulfate.

The obtained fiber had a shrinkage of merely 2.5% after a treatment for 1 hour in boiling water and a softening temperature of 200° C. in air, its elastic recovery was excellent up to high elongation, like the fiber of the preceding example.

*Example 14*

A fiber heat-treated as in the preceding examples was treated for 1.5 hours at 60° C. in an aqueous solution containing 0.5% of iso-butyraldehyde, 2% of glyoxal, 15% of sulfuric acid, and 15% of sodium sulfate.

The obtained fiber had excellent water resistance, heat and wet heat resistance, and elastic recovery properties.

*Example 15*

A polyvinyl alcohol film prepared by evaporation of an aqueous polyvinyl alcohol solution and treated for 10 minutes in nitrogen gas of 200° C., was treated for 1 hour at 60° C. in an aqueous emulsion containing 2% of n-octylaldehyde, 5% of sulfuric acid, and 2% of fatty alcohol sulfate, and subsequently for 1 hour at 70° C. in an aqueous solution containing 0.3% of terephthalic aldehyde, 10% of sulfuric acid, and 10% of sodium sulfate.

The obtained film had better heat resistance, hot-water resistance, and elastic recovery properties than a film which was acetalized by n-octylaldehyde only.

The term "polyvinyl alcohol" as used in the specification and claims is to be understood to refer not only to polyvinyl alcohol proper but also to its copolymers with other polymerizable compounds, such as ethylene, maleic anhydride, acrylonitrile, and the like, provided such copolymers contain at least 80 percent by weight of polyvinyl alcohol. Such copolymers are known in the art and are used for the preparation of the same articles, particularly fibers, in the same way as polyvinyl alcohol.

This application is a continuation of application Serial Number 340,922, filed March 6, 1953 of Tetsuro Osugi, Masakazu Matsumoto, Kenichi Tanabe and Yasuji Ohno, now abandoned.

We claim:

1. The method of improving the properties of polyvinyl alcohol fibers and films which comprises acetalizing previously-formed polyvinyl alcohol fibers and films which shrink not more than 5% in length in 80° C. water by reaction with an aqueous acidified dispersion containing at least one surface active agent and about 0.5 to 15% by weight of a dispersed reactant selected from the group consisting of benzaldehyde and acetals thereof formed with lower alcohols having up to 3 carbon atoms, the total degree of acetalization of the fibers and films not exceeding 50% and the degree of acetalization with said reactant being at least 5%, said reactant being at most sparingly-soluble in water.

2. The method of claim 1 wherein said reactant is benzaldehyde.

3. The method of claim 1 wherein the acetalization reaction is carried out at about 40° C. to 70° C. for about 1 to 2 hours.

4. The method of claim 1 wherein the fibers and films are acetalized by the said reactant and also by formaldehyde.

5. The method of claim 1 wherein the fibers and films are acetalized by the said reactant and also by a dialdehyde.

6. The method of claim 1 wherein the fibers and films are acetalized by the said reactant and also by a ketoaldehyde.

References Cited in the file of this patent

UNITED STATES PATENTS

| | | |
|---|---|---|
| 2,072,302 | Hermann et al. | Mar. 2, 1937 |
| 2,310,943 | Dorough et al. | Feb. 16, 1943 |
| 2,327,872 | Dahle | Aug. 24, 1943 |
| 2,380,033 | Dorough et al. | July 10, 1945 |
| 2,610,360 | Cline et al. | Sept. 16, 1952 |
| 2,636,803 | Cline et al. | Apr. 28, 1953 |
| 2,636,804 | McCleltan et al. | Apr. 28, 1953 |
| 2,668,803 | Lantz | Feb. 9, 1954 |
| 2,977,183 | Osugi et al. | Mar. 28, 1961 |
| 2,990,235 | Tomonari et al. | June 27, 1961 |

FOREIGN PATENTS

| | | |
|---|---|---|
| 459,878 | Great Britain | Jan. 18, 1937 |

OTHER REFERENCES

Sakurada: Bull. Inst. Phys. Chem. Research (Tokyo), 1942, 21, 1077–1083 (through Chem. Abstr. 1948, 42, 1780d). (Copy in Journal Textile Inst., June 1948, page A 316.)

UNITED STATES PATENT OFFICE
CERTIFICATE OF CORRECTION

Patent No. 3,137,540                                                          June 16, 1964

Tetsuro Osugi et al.

It is hereby certified that error appears in the above numbered patent requiring correction and that the said Letters Patent should read as corrected below.

Column 7, line 75, after "properties" insert -- than that formalized. --.

Signed and sealed this 10th day of November 1964.

(SEAL)
Attest:

ERNEST W. SWIDER                                                     EDWARD J. BRENNER
Attesting Officer                                                        Commissioner of Patents